United States Patent
Chau

(10) Patent No.: US 11,478,723 B2
(45) Date of Patent: Oct. 25, 2022

(54) APPARATUS FOR GENERATING THREE-DIMENSIONAL VISUAL EFFECTS, AND SMOKE-GENERATING DEVICE FOR SUCH AN APPARATUS

(71) Applicants: Michel Chau, Champlan (FR); Luc Nguyen, Garden Grove, CA (US); Jui-Hung Wu, Taipei (TW)

(72) Inventor: Michel Chau, Champlan (FR)

(73) Assignees: Michel Chau, Champlan (FR); Luc Nguyen, Garden Grove, CA (US); Jui-Hung Wu, Taipei (TW)

( * ) Notice: Subject to any disclaimer, the term of this patent is extended or adjusted under 35 U.S.C. 154(b) by 710 days.

(21) Appl. No.: 16/466,962

(22) PCT Filed: Dec. 5, 2017

(86) PCT No.: PCT/IB2017/057654
§ 371 (c)(1),
(2) Date: Aug. 29, 2019

(87) PCT Pub. No.: WO2018/104863
PCT Pub. Date: Jun. 14, 2018

(65) Prior Publication Data
US 2020/0261822 A1    Aug. 20, 2020

(30) Foreign Application Priority Data

Dec. 6, 2016    (FR) ........................................ 1601734
Apr. 28, 2017   (FR) ........................................ 1770433

(51) Int. Cl.
*A63J 5/02*    (2006.01)
*A63J 25/00*   (2009.01)
*G02B 30/56*   (2020.01)

(52) U.S. Cl.
CPC ............... *A63J 5/025* (2013.01); *A63J 25/00* (2013.01); *G02B 30/56* (2020.01)

(58) Field of Classification Search
CPC .. A63H 19/24; A63H 33/22; A63J 5/02; A63J 25/00
(Continued)

(56) References Cited

U.S. PATENT DOCUMENTS

| 4,871,115 A | 10/1989 | Hessey |
| 4,990,290 A | 2/1991 | Gill et al. |

(Continued)

FOREIGN PATENT DOCUMENTS

| CN | 2149949 Y | 12/1993 |
| CN | 2234806 Y | 9/1996 |

(Continued)

OTHER PUBLICATIONS

Office Action dated Jan. 11, 2022; Japanese Patent Application No. 2019-549669; 9 pages total.

(Continued)

*Primary Examiner* — Kien T Nguyen
(74) *Attorney, Agent, or Firm* — Womble Bond Dickinson (US) LLP

(57) ABSTRACT

The invention proposes an apparatus for generating three-dimensional visual effects, characterised in that it comprises, in combination: a controlled smoke generator (10) comprising a synthetic smoke source and a means for directionally propelling the smoke produced by the generator in order to form a plume of smoke extending in a certain direction, and a controlled light generator (20), suitable for generating one or more light beams in the plume of smoke and in the direction in which it extends, the light beam or beams being essentially contained in said plume of smoke. Application in (Continued)

particular to the production of "lightsaber" visual effects, and more generally to varied three-dimensional light effects.

23 Claims, 3 Drawing Sheets

(58) Field of Classification Search
USPC .................................. 472/65; 40/427–428
See application file for complete search history.

(56) References Cited

U.S. PATENT DOCUMENTS

| | | | |
|---|---|---|---|
| 6,280,278 B1* | 8/2001 | Wells | A63H 19/14 |
| | | | 446/25 |
| 2005/0101393 A1* | 5/2005 | Starr | A63J 5/023 |
| | | | 472/65 |
| 2014/0227666 A1 | 8/2014 | Milanov et al. | |
| 2015/0105167 A1 | 4/2015 | Kim et al. | |
| 2016/0023123 A1 | 1/2016 | Chang | |
| 2017/0128825 A1 | 5/2017 | Wu | |
| 2018/0136075 A1* | 5/2018 | Lerman | G01M 3/025 |

FOREIGN PATENT DOCUMENTS

| | | |
|---|---|---|
| CN | 201921526 U | 8/2011 |
| CN | 202237293 U | 5/2012 |
| CN | 203108224 U | 8/2013 |
| CN | 104274988 A | 1/2015 |
| CN | 204073456 U | 1/2015 |
| CN | 105517655 A | 4/2016 |
| CN | 205699495 U | 11/2016 |
| EP | 1985963 A1 | 10/2008 |
| EP | 2837987 A2 | 2/2015 |
| EP | 2955474 A1 | 12/2015 |
| FR | 2671871 A1 | 7/1992 |
| FR | 2794990 A1 | 12/2000 |
| GB | 2333466 A | 7/1999 |
| JP | 2003169970 A | 6/2003 |
| KR | 10-1094546 B1 | 12/2011 |
| KR | 101183489 B1 | 9/2012 |
| WO | 2006/064190 A1 | 6/2006 |
| WO | 2013/049901 A1 | 4/2013 |
| WO | 2014/030987 A1 | 2/2014 |

OTHER PUBLICATIONS

International Search Report of the International Searching Authority dated Mar. 23, 2018; International Application No. PCT/IB2017/057654 (7 pgs. total, with translation).

Written Opinion of the International Searching Authority dated Mar. 23, 2018; International Application No. PCT/IB2017/057654 (11 pgs. total, with translation).

Office Action dated Aug. 31, 2021; Indian Patent Application No. 201947026906, 6 pages total.

Office Action dated Nov. 12, 2020; Chinese Patent Application No. 201780085782.5; 25 pages total.

Office Action dated Jul. 5, 2021; Chinese Patent Application No. 201780085782.5; 15 pages total.

Office Action dated Mar. 16, 2022; Korean Patent Application No. 10-2019-7019604; 9 pages total.

* cited by examiner

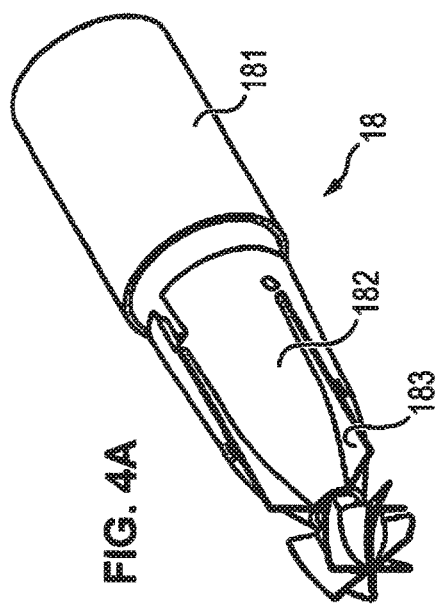
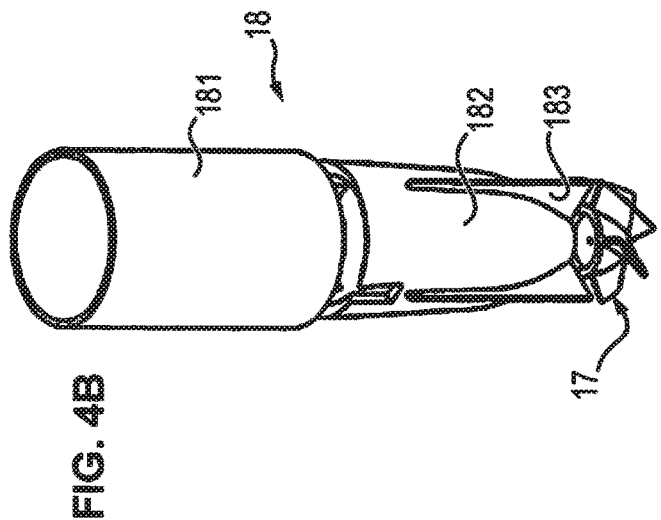
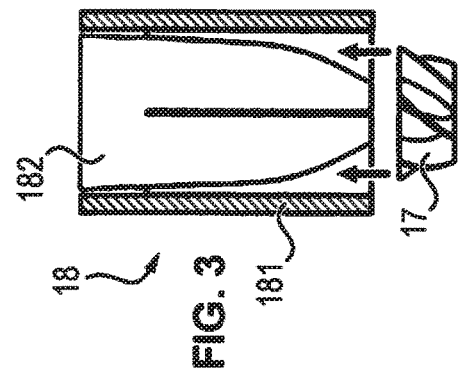
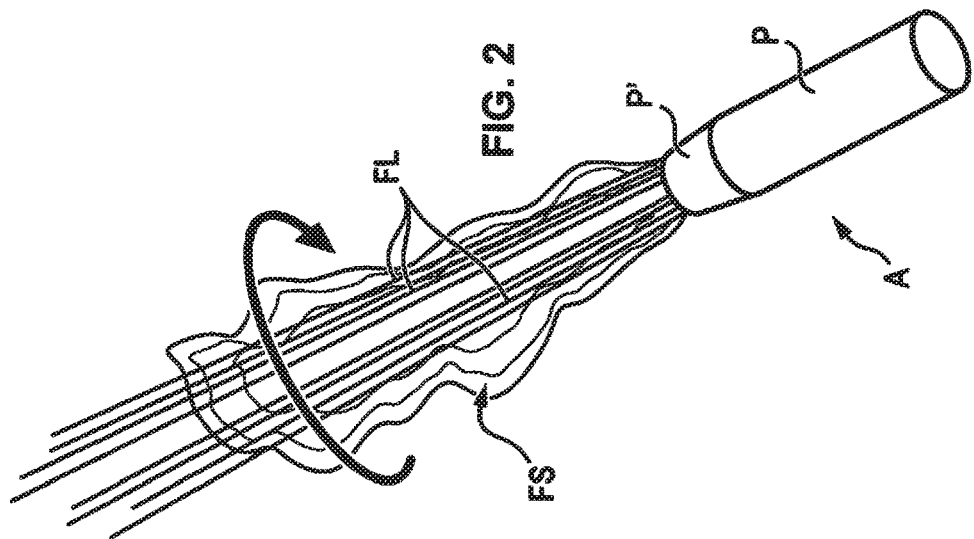

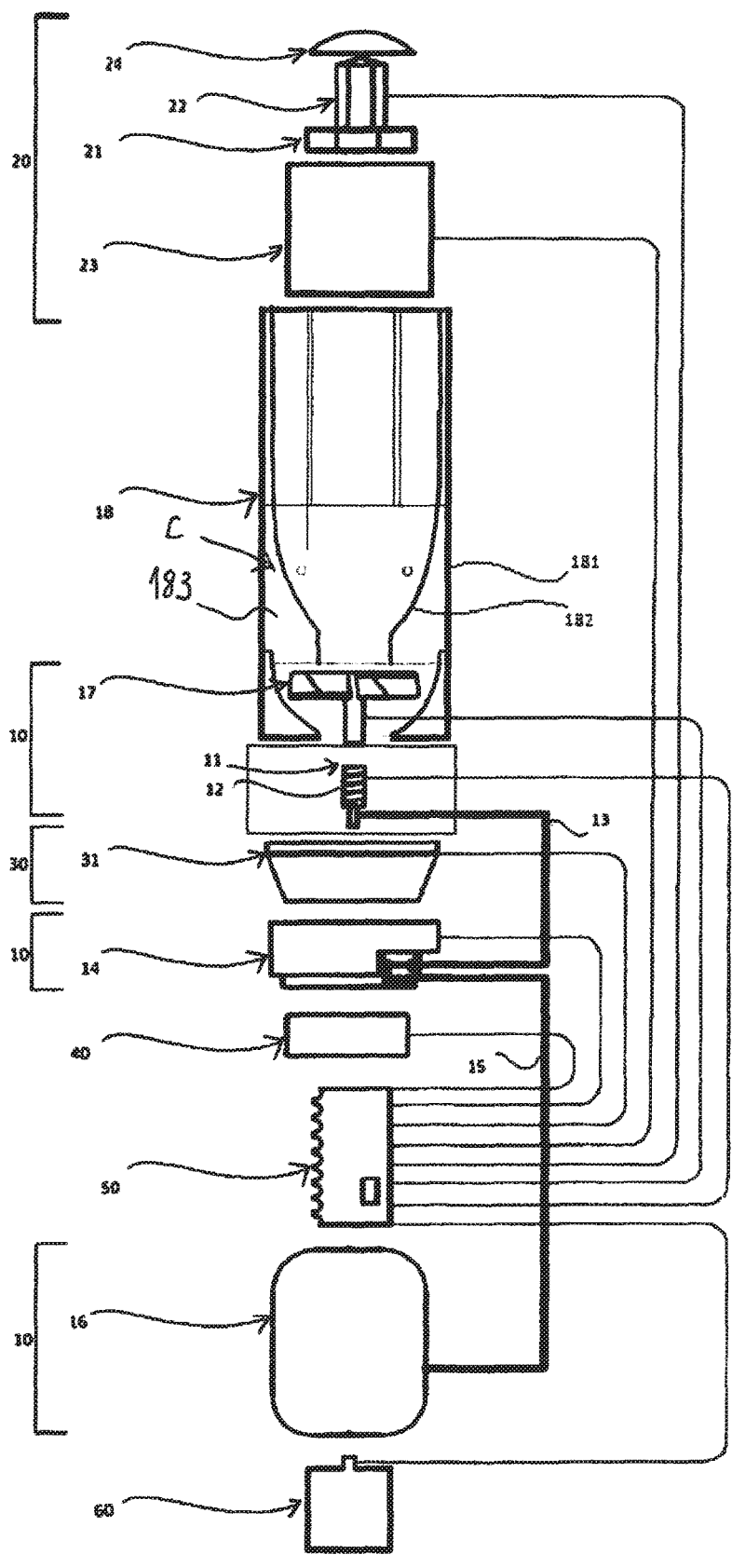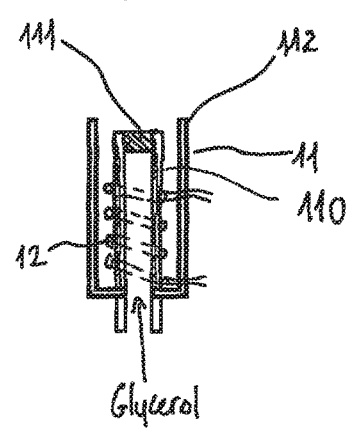

APPARATUS FOR GENERATING THREE-DIMENSIONAL VISUAL EFFECTS, AND SMOKE-GENERATING DEVICE FOR SUCH AN APPARATUS

CROSS-REFERENCE TO RELATED APPLICATIONS

This application is a National Stage of International Application No. PCT/IB2017/057654 filed on Dec. 5, 2017, which claims priority to French Patent Application No. 1770433 filed on Apr. 28, 2017 and French Patent Application No. 1601734 filed on Dec. 6, 2016, the disclosures of which are incorporated herein by reference.

FIELD OF THE INVENTION

This invention generally relates to the field of apparatus for generating 3D light patterns. It particularly applies to devices intended to reproduce fake light weapons of a 'light saber' style for special effects, games, shows etc.

BACKGROUND OF THE INVENTION

From document WO2006064190A1 is known a smoke generator using a peristaltic pump as the pump feeding the liquid to be vaporized.

From document WO2014030987A1 is known a smoke generator. Its main drawback is its large size, which makes it bulky and non-portable. It must also be plugged to mains power which excludes any nomad use.

Also from document EP2837987A2 is known a smoke generator allowing to master the smoke parameters without nevertheless being coupled to a light projector device.

From document WO2013049901A1 is known a portable device that associates a smoke production system with a light source, however in two distinct pieces of equipment and without any correlation.

Finally from documents FR 2 671 871 A1, FR 2 794 990 A1 and US 2015/105167 A1 are known devices that associate in a same housing a smoke generator and a light generator, without any particular correlation therebetween.

SUMMARY OF THE INVENTION

This invention seeks to allow materializing a 3D visual effect in a particularly expected manner, by defining a synthetic smoke space having a limited geometry space used as a projection medium for one or several light sources.

It is thus provided according to the invention an apparatus for generating 3D visual effects, characterized in that it comprises in combination:

a controlled smoke generator comprising a synthetic smoke generator and a means for directionally propelling the smoke produced by the generator to form a smoke beam elongated in a certain direction, and a controlled light generator, capable of generating one or more light beams in the smoke beam and along the elongation direction thereof, the light beam or beams being essentially contained in said smoke beam.

The apparatus optionally further comprises the following additional features, taken individually or in any combinations that the skilled person will consider as being technically compatible:

the synthetic smoke generator comprises a nozzle provided with a heating means, supplied with a liquid substance capable of forming a dense smoke when heating up.

the nozzle comprises a fibrous tubular element capable of forming a buffer storage zone for said liquid substance.

the heating means comprises a resistive wire surrounding said fibrous tubular element.

the resistive wire grips the fibrous tubular element so as to contribute to the mechanical integrity of the latter.

the nozzle and the heating means are surrounded by a generally air-tight, close-ended sleeve.

the propelling means comprises a turbine.

the turbine revolves around an axis which is generally superimposed with an axis of the nozzle.

the propelling means comprises a device for concentrating the turbine flow.

the concentrating device defines an annular channel having a generally constant outer width and a variable inner width.

the light generator comprises at least one fixed light source.

the light generator comprises at least one light source mounted on a movable element.

the movable element comprises a rotating member driven by an electric motor.

the light source or sources are intensity-controlled in synchronism with the revolution of the rotating member.

the rotating member is driven at a rotational speed higher than about 10 revolutions per second.

the light generator comprises at least one optical element for light concentration.

the light generator comprises at least one light source of the light emitting diode type.

the light generator comprises at least one light source of the laser diode type.

the apparatus comprises a control unit capable of dynamically controlling the smoke generator and the light generator.

that the control unit is capable of controlling all or part of the following parameters:
synthetic smoke density,
synthetic smoke propulsion,
light color,
light intensity,
light movement.

The invention affords, via a defined vapor volume (typically a glycerol vapor), to imprint on this space, in a precise and highly visible manner, a 3D image. The movements of the light source or sources (as well as their intensity and color control as the case may be) allows 3D shapes to appear, such as a cylinder, a cone, a beam, a pyramid, or more complex shapes such as a flame. With sources of different colors, the apparatus allows to generate multi-colored visual effects which, when mixed together, produce a spectrum of colors.

The apparatus according to the invention can be compact, portable and hand held.

The user experience can be increased by the use of an audio system and a vibrating motor producing a force feedback effect.

According to another aspect, one provides according to the invention a synthetic smoke generating device, comprising a nozzle provided with a heating means, supplied with a liquid substance capable of forming a dense smoke when heating up, characterized in that the nozzle comprises a fibrous tubular element capable of forming a buffer storage zone for said liquid substance.

Optional aspects of this device are the following:
the heating means comprises a resistive wire surrounding said fibrous tubular element.

the resistive wire grips the fibrous tubular element so as to contribute to the mechanical cohesion of the latter.

the nozzle and the heating means are surrounded by a generally air-tight, close-ended sleeve.

BRIEF DESCRIPTION OF THE DRAWINGS

Other aspects, aims and advantages of this invention will be more evident from the following detailed description of a preferred embodiment thereof, given as a non-limiting example and made with reference to the appended drawings, in which:

FIG. 2 is an overall view of the apparatus, FIG. 3 in a side elevated view of a smoke guiding device that can be provided in the device of FIGS. 1 and 2, FIGS. 4A and 4B are exploded perspective views from two different points of view of the device of FIG. 3, FIG. 5 is an overall diagrammatic view similar to FIG. 1, with the guiding device of FIGS. 3, 4A and 4B, and FIG. 6 is an enlarged scale view of the details of a particular embodiment of a nozzle of the apparatus.

DETAILED DESCRIPTION OF A PREFERRED EMBODIMENT

Figure 1:
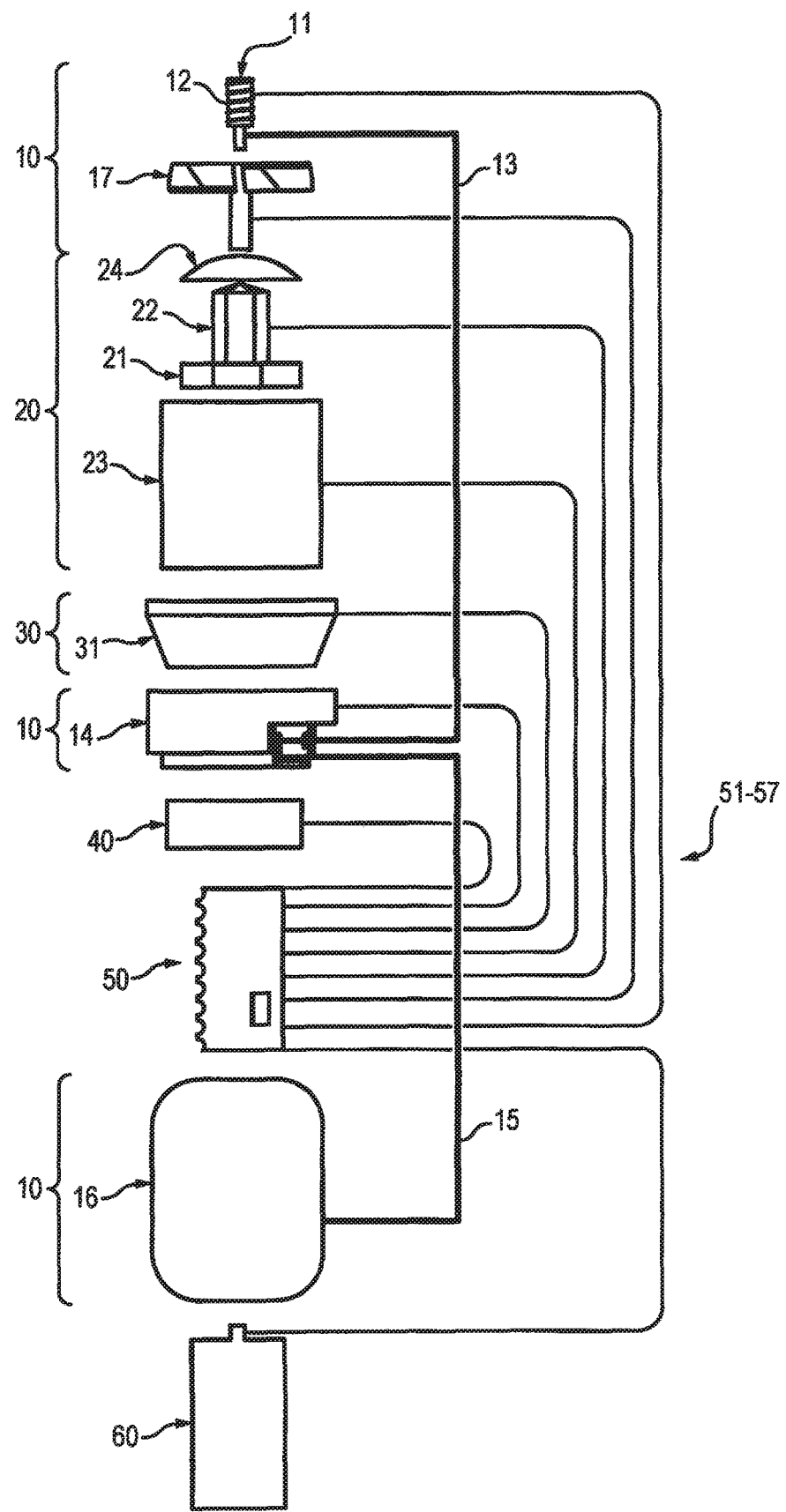
FIG. 1 is an overall diagrammatic and axially exploded view of the main components of an apparatus according to an embodiment of the invention.

Referring first to FIG. 1, a 3D light effect generation apparatus according to the invention first comprises a smoke generating device 10 comprising a nozzle 11 surrounded by a heating electrical resistor 12.

The heat generated by resistor 12 allows to vaporize the glycerol. Advantageously this resistor is made of a resistive wire having an electric resistivity of a couple of Ohms/meter, capable of generating in nozzle 11 a temperature in the order of 180° C. to 250° C. which is preferably adjustable. The resistor is driven by a central unit 50 in the form of an electronic board driven by a microcontroller; that will be described later on. The assembly is powered by a rechargeable battery 60.

By varying the heating temperature though control at the central unit 50, the density of the glycerol vapor is varied, depending on the desired visual effect. This control can be made in a basic embodiment merely through a controlled switch that selectively powers on and off resistor 12. The delivered power can also be adjusted by varying the power supply voltage of the resistor, by means of a pulse width modulation PWM, etc.

In a non-illustrated manner, resistor 12 is surrounded by a thermal insulator, for example of the mineral wool type, and the assembly is protected by a rigid sheath, for example a perforated metal sheath through which the glycerol vapor generated by heating, in the form of more or less dense smoke, can exit.

The smoke generation device 10 further comprises a turbine 17 intended to propel the generated glycerol vapor and driven by the central unit 30. By adjusting the revolution speed of the turbine, the smoke can be propelled to a variable distance from nozzle 11, in a stable or variable manner, depending on the desired visual effect.

Nozzle 11, which is made from metal so as to be heat resistant, is connected via a duct 13 e.g. made of silicone to a glycerol distribution pump 14. The latter is connected via another duct 15 to a glycerol reservoir 16 provided with a cap (not shown) to allow filling.

The pump 14, driven from central unit 50, allows feeding nozzle 11 with glycerol from reservoir 16. This driving is performed in a coordinated manner with the heating by resistor 12 in order to generate at nozzle 11 the desired vapor density, according to the visual effect to be obtained.

The pump preferably is a peristaltic pump or a piston pump, while other types of pumps can of course be used.

Glycerol was chosen for its viscosity and its well-known physical-chemical properties for generating a potentially very dense smoke when heated. It is non-toxic and widely used notably in the pharmaceutical industry. Other substances with similar properties can of course be used.

The device further comprises a light generator 20. Device 20 comprises a rotating plate 21 to which one or several light sources 22 are affixed, preferably of the light-emitting diode LED type or Laser diode type.

The choice of the Laser diode type is made according to the required light power and potential regulatory constraints.

The or each source generates a light beam which is more or less concentrated.

The rotating plate 21 is driven at an axle (not shown) by a gear motor 23 driven by the central unit 50 so as to be able to rotate on an axis corresponding to a general axis of the apparatus, preferably at a speed which preferably is adjustable.

This speed is typically comprised between 10 and 30 revolutions per second, so that the visual effect obtained, thanks to the human eye persistence, appears stable. As a variant, one can provide slower and/or irregular movements to be obtain other types of visual effects.

The light-generating device further comprises an optical assembly 24, made of one or several lenses, intended to direct the beam generated by the light source (or the beams generated by a plurality of sources) towards a region of the apparatus where the smoke is emitted (nozzle 11 region). Preferably, the or each beam exiting the optical assembly 24 is a thin beam, with sharp edges, so that the cooperation of the light with the smoke as it travels through the latter can generate a variety of visual effects (depending notably on the smoke intensity, the distance to which it is propelled, the light intensity, the color of the light if the sources allow to change it, etc.) rather than a simple halo that would be obtained with a too diffuse light.

The apparatus can further comprise a sound generating device 30 provided with a loudspeaker 31 or other acoustic transducer, the sound generation being preferably performed at the central unit XX. It can also comprise a mechanical vibration generator 40 (known as a 'force feedback' mechanism in the field of games and toys), so as to render (for example in a handle of the apparatus, not shown in FIG. 1}, a mechanical action associated with certain movements of the apparatus.

Advantageously, the apparatus further comprises a motion sensor (typically an inertial unit or a set of accelerometers), in a non-explicitly shown manner and preferably incorporated to the electronic board of central unit 50.

The central unit 50 drives all the above described elements, as previously mentioned, by being connected thereto via a set of electrical conductors 51-57.

Battery 60 advantageously is a lithium-ion type battery with appropriate voltage and capacity.

FIG. 2 is an overall view of an apparatus A according to the invention.

All of the elements described above are housed in a handle P of the apparatus. As a variant, certain elements are housed in handle P and others, notably the nozzle 11 of the smoke generator and the turbine, in a part P' which is an extension of handle P.

An opening O formed in this part P' allows the synthetic smoke FS to exit, forming a column through which travel the light beam or beams FL which move by virtue of rotating plate 21, so as to render here the visual effect of a light cylinder.

The operation of the apparatus will now be described.

During a start-up phase, the heating device 12 of nozzle 11 is heated for a certain length of time, typically a few seconds, while pump 14 is actuated to supply glycerol.

Once a sufficient quantity of smoke is exiting nozzle 11, the light sources 22 are turned on and moved by gear motor 23, while turbine 17 is started to propel the smoke and form column FS up to a controlled distance, thus constituting the vapor envelope in which the 3D image will materialize by virtue of the light beam(s).

In steady operation, the driving of heating device 12, pump 14, turbine 17 and light sources (in their movement thanks to gear motor 23 and if applicable in their color and/or intensity) allows to widely vary the visual effect obtained.

Now referring to FIGS. 3, 4A and 4B, an additional element of the smoke generation device has been shown, which comprises a guide 18 formed of a generally tubular outer element 182 and of an inner element 182 whose width gradually increases, preferentially but in a non-limiting way according to the illustrated profile, from an inlet region adjacent turbine 17 toward an exit region. An annular channel C of generally constant outer width and variable inner width is thus defined. Radially oriented spacers 183 allows an axis-to-axis alignment of elements 181, 182 while channeling the flow along the axis.

It is understood that this guide allows to generate at its exit a laminar flow of annular cross-section, and it has been observed that such a flow allows to obtain a smoke column FS that remains with an essentially constant width and essentially homogeneous over a large distance, to obtain a particularly realistic 'light saber' type visual effect (in conjunction with a set of parallel light beams turning around the axis of plate 21). In this embodiment, the light generator 20 is housed in the inner space defined by guide 18 so as to obtain a good capacity. The smoke exits from guide 18 peripherally in the form of a ring surrounding the light generator 20.

FIG. 5 is a view similar to FIG. 1, where the guiding device has been integrated according to this variant. In this Figure, elements of parts identical to those of FIG. 1 are designated by the same reference signs and will not be described again.

In is observed that in this embodiment, the guiding device 18 is located downstream of nozzle 11 where the glycerol vapor is produced, and that the light generator 20 is located downstream of said guiding device.

In FIG. 6 has been shown an enlarged view of a nozzle structure according to the invention.

Nozzle 11 comprises a fiberglass tube 110 surrounded we a resistive wire 12 forming the heating electric resistor. The fiberglass tube exhibits a certain porosity that allows the liquid glycerol to move in radial direction from the inside of tube 110, supplied with glycerol by pump 14, toward the outside where it forms the smoke under the effect of resistive wire 12. This porosity of tube 110 allows the latter to constitute a small buffer reserve for glycerol, regulating the smoke production.

This small reserve of glycerol, retained by capillarity inside the glass fibers, further allows to stabilize the temperature of the resistive wire by virtue of an evaporation of the glycerol which increases with the temperature, and thus to reduce the risk of self-combustion of the liquid glycerol. Indeed, it has been observed that with a dry nozzle (which does not retain glycerol), the resistive wire heats up more intensely and when glycerol arrives, the first contact of the latter with the overheated resistor can cause it to ignite.

Sheath 110 is closed at is upper end at 111, the glycerol being constrained to circulate radially toward resistive wire 12.

The nozzle further comprises an outer sheath 112, preferably made of metal, in which the obturated tube 110 and resistive wire 12 are housed. Sheath 112 is open at its free end (at the top in the Figure) to allow the smoke to escape toward turbine 17. This sheath 112 further allows to limit the volume of air surrounding tube 110, so that in the were glycerol ignition starts, the maintenance of the combustion with the oxygen in the air is hindered, and that the combustion thus spontaneously stops.

It will be noted here that the porosity of tube 110 can advantageously be obtained by "running-in" the nozzle for a certain time by heating with the resistive wire, wherein the resin that conventionally binds together the glass fibers consumes itself to leave between the fibers void spacers leading to its porosity. At the same time, the resistive wire 12 that grips around the sheath contributes to its mechanical integrity despite the degradation of the resin.

If necessary, a structural element such as a metal tube (not shown) partially surrounding the sheath 110 is provided to give the assembly a sufficient strength.

Of course, this invention is by no means limited to the described and shown embodiment, but the skilled person will be able to bring numerous variations and changes.

The invention claimed is:

1. An apparatus for generating 3D visual effects, the apparatus comprising:
   a controlled smoke generator comprising a synthetic smoke generator and propelling device for directionally propelling smoke produced by the synthetic smoke generator to form a smoke beam elongated in a certain direction; and
   a controlled light generator for generating one or more light beams in the smoke beam and along the elongation direction thereof, the one or more light beams being contained in the smoke beam;
   wherein the controlled light generator comprises at least one light source mounted on a movable element.

2. The apparatus according to claim 1, wherein the synthetic smoke generator comprises a nozzle provided with a heating device, supplied with a liquid substance that forms a dense smoke when heating up.

3. The apparatus according to claim 2, wherein the nozzle comprises a fibrous tubular element that forms a buffer storage zone for the liquid substance.

4. The apparatus according to claim 3, wherein the heating device comprises a resistive wire surrounding the fibrous tubular element.

5. The apparatus according to claim 4, wherein the resistive wire grips the fibrous tubular element so as to contribute to the mechanical cohesion of the fibrous tubular element.

6. The apparatus according to claim 2, wherein the nozzle and the heating device are surrounded by an air-tight, close-ended sleeve.

7. The apparatus according to claim 2, wherein the propelling device comprises a turbine.

8. The apparatus according to claim 7, wherein the turbine revolves around an axis which is superimposed with an axis of the nozzle.

9. The apparatus according to claim 8, wherein the propelling device comprises a device for concentrating a turbine flow.

10. The apparatus according to claim 9, wherein the device for concentrating the turbine flow defines an annular channel having a constant outer width and a variable inner width.

11. The apparatus according to claim 1, wherein the at least one light source comprises at least one fixed light source.

12. The apparatus according to claim 1, wherein the movable element comprises a rotating member driven by an electric motor.

13. The apparatus according to claim 12, wherein the at least one light source is intensity-controlled in synchronism with the revolution of the rotating member.

14. The apparatus according to claim 12, wherein the rotating member is driven at a rotational speed higher than about 10 revolutions per second.

15. The apparatus according to claim 1, wherein the controlled light generator further comprises at least one optical element for light concentration.

16. The apparatus according to claim 1, wherein the at least one light source is of a light emitting diode type.

17. The apparatus according to claim 1, wherein the at least one light source is of a laser diode type.

18. The apparatus according to claim 1, further comprising a control unit for dynamically controlling the controlled smoke generator and the controlled light generator.

19. The apparatus according to claim 18, wherein the control unit controls at least one of the following parameters:
synthetic smoke density,
synthetic smoke propulsion,
light color,
light intensity, or
light movement.

20. A synthetic smoke generating device, comprising:
a nozzle and a heating device, supplied with a liquid substance that forms a dense smoke when heating up, wherein the nozzle comprises a fibrous tubular element for forming a buffer storage zone for the liquid substance; and
a guide formed of a tubular outer element and an inner element having a width that gradually increases from an inlet region adjacent to a propelling device toward an exit region, so as to generate at the exit region a laminar flow of smoke beam when the dense smoke is directionally propelled by the propelling device to form the smoke beam in an elongated direction.

21. The device according to claim 20, wherein the heating device comprises a resistive wire surrounding the fibrous tubular element.

22. The device according to claim 21, wherein the resistive wire grips the fibrous tubular element so as to contribute to the mechanical integrity of the fibrous tubular element.

23. The device according to claim 20, wherein the nozzle and the heating device are surrounded by an air-tight, close-ended sleeve.

* * * * *